United States Patent
Wetzel

[15] 3,679,078
[45] July 25, 1972

[54] BASKET DEVICE FOR REFUSE TRUCKS

[72] Inventor: Walter Wetzel, 34825 Dryden Drive, Sterling Heights, Mich. 48077

[22] Filed: Jan. 29, 1971
[21] Appl. No.: 110,864

[52] U.S. Cl. .............................214/302, 214/38 R, 214/77, 214/142
[51] Int. Cl. ...........................................B65f 3/02
[58] Field of Search.....................214/17 C, 38 R, 41, 78, 80, 214/302, 90, 91, 142, 77

[56] References Cited

UNITED STATES PATENTS

| 2,344,312 | 3/1944 | Lichtenberg | 214/17 C |
| 3,584,749 | 6/1971 | Parello | 214/38 R |

*Primary Examiner*—Robert G. Sheridan
*Assistant Examiner*—Lawrence J. Oresky

[57] ABSTRACT

An attachment for refuse trucks which will facilitate easy handling of refuse that is being carted away. The device includes a motor operated basket which has counter-balances for the easy manipulation thereof.

4 Claims, 3 Drawing Figures

PATENTED JUL 25 1972          3,679,078

INVENTOR.
WALTER WETZEL

BASKET DEVICE FOR REFUSE TRUCKS

This invention relates to refuse trucks, and more particularly to a basket device for adaption to a refuse truck.

It is therefore the primary purpose of this invention to provide a basket device for refuse trucks which will include a motor driven mechanism including pulleys, belts and wheels having counterbalances attached thereto.

Another object of this invention is to provide a basket device which when in its fully lowered position for receiving refuse, will have wheel members allowing the truck to be moved while the basket is in its lowered position.

A further object of this invention is to provide a basket device which may be used in conjunction with a cart having manual lever means for emptying special refuse cans having a pivotable lid thereupon, the cart being mobile.

Other objects of the present invention are to provide a basket device for refuse trucks which is simple in design, inexpensive to manufacture, rugged in construction, easy to use and efficient in operation.

These and other objects will be readily evident upon a study of the following specification and the accompanying drawing wherein.

Figure 1:
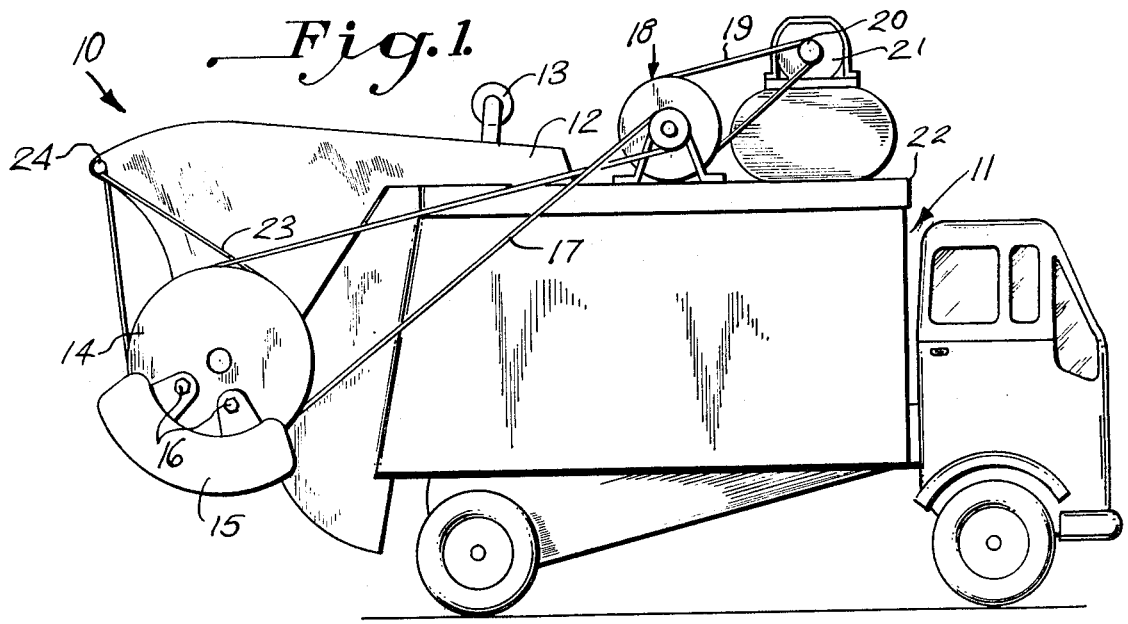
FIG. 1 is a side view of the present invention shown in its full closed position.

According to this invention, a basket device 10 for a refuse truck 11 is shown to have an extending 12 to which is attached a pair of wheels 13 allowing for the basket device 10 to be in its full lowered position while the refuse truck 11 may be moved to another position for receiving refuse.

A pair of pulleys 14 on each side of device 10, has secured thereto, each, a counter-balance 15 which is secured thereto by means of a pair of suitable bolt fasteners 16.

An endless belt 17 is carried upon each of the pulleys 14 on either side of basket device 10, the belts 17 also being carried upon pulleys 18.

An endless drive belt 19 is carried also upon pulleys 18 and is carried upon pulleys 20 of the electric motor 21, the electric motor 21 being powered by the electrical system of the refuse truck 11.

Motor 21 is secured in a suitable manner (not shown) to the body 22 of refuse truck 11. A pair or endless belts 23 are also carried upon pulleys 14 of device 10, the belts 23 are carried around pulleys 24 at one end of device 10.

When motor 21 is operated by the driver he will cause the side pulleys 14 to be rotated and with the aid of the counter-balances 15, the device 10 will assume its load position with the wheels 13 therefore, intact with the ground.

A pair of refuse cans 25 having pivotable lids 26 are brought to their emptying position by means of a hand lever 27 carried within the lugs 28 of the cart frame 29.

The frame 29 is secured fixedly by any suitable means to the base 30 which carries wheels 31 allowing for mobility of the lever operated cans 25.

Lever 27 is secured to bar 32 carried within the lugs 28 of the frame 29.

Figure 2:
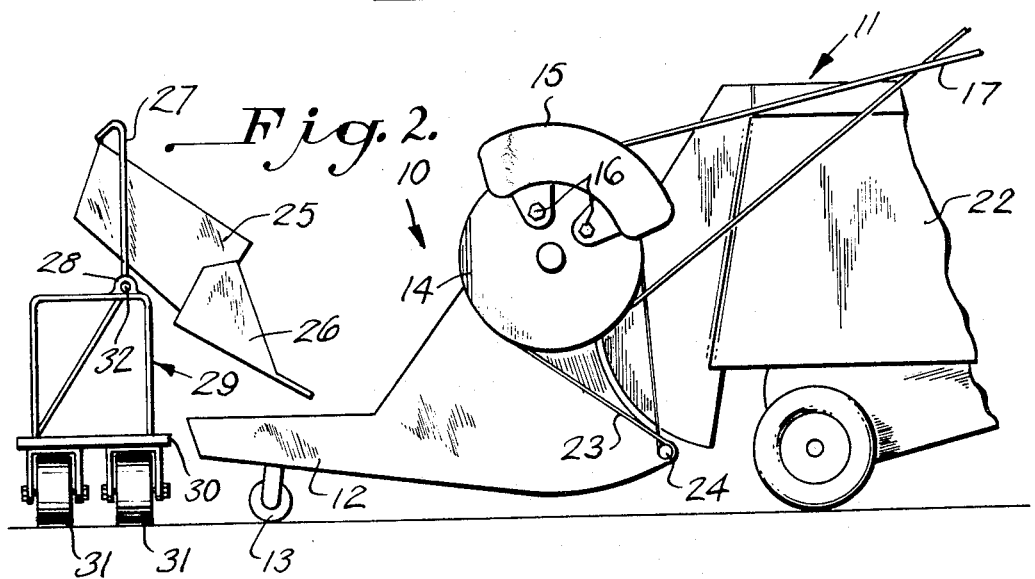
FIG. 2 is a fragmentary side view similar to FIG. 1, but showing the basket device in its full lowered position with the cart and cans shown in a dumping position.
Figure 3:
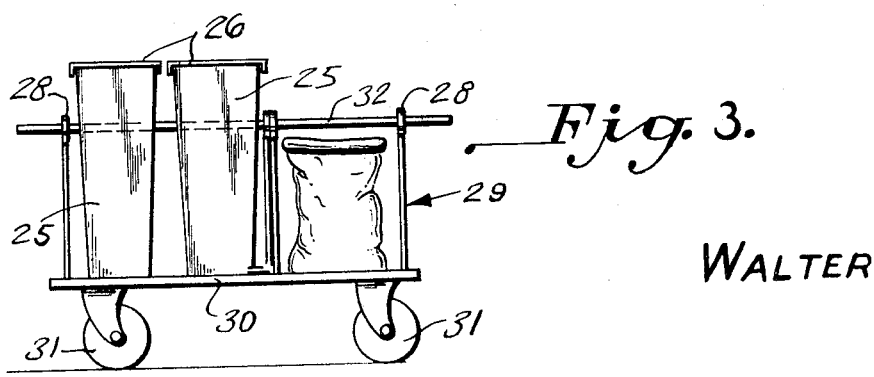
FIG. 3 is a side view of the cart and cans shown in FIG. 2 of the drawing.

As can be seen in FIG. 2 of the drawing, the cans 25 are pivoted to their dumping position, this position automatically causing the lids 26 to pivot away from the opening and allows the contents to fall by gravity means into the basket device 10.

When the dumping process is finished, motor 21 is reversed by the driver or other operator, and the pulleys will then rotate device 10 to its full upward position, thus dumping the contents into the body 22 of the refuse truck 11.

What I claim is:

1. A refuse system including a basket device for refuse trucks, comprising a motor driven and rotatable receptacle for receiving refuse and emptying it into the body of said refuse truck, a pair of pulley wheels, one on each side of said device providing the means for receiving power from the motor, counter-balance means carried by said device for flawless rotation thereof, a lever-operated cart for use of said device with pivotable can means for receiving refuse and delivering refuse into said device.

2. The combination according to claim 1, wherein said pulley wheels are each secured to one side of said device by shaft means and said pulleys receive endless belts, each of said endless belts being carried upon pulley means secured to the top of said refuse truck and further belt means carried by said mechanism is carried by the pulleys of the motor mounted to said body of said truck.

3. The combination according to claim 2, wherein said motor when operated by the driver through switch means of the electrical system of said truck, will cause said belts to rotate their respective pulleys, and thus rotate said basket device away from its dumping position into the loading position, the loading position being with the elongated end in close proximity with the ground, its associated wheels attached thereto being in contact with the ground so that the truck may be moved without dragging said basket device and said counter-balances are secured to said wheels carried on either side of said device, said counter-balances allowing for the smooth operation of loading and unloading said basket device, said basket device being loaded by pivotable cans which are lever operated from a cart, said cans being stationary upon the base of said car when full of refuse and said cans are pivoted upwards so that the bottom portion is higher than the upper portion enough to be gravity fed into said basket and the lids of said cans are pivotable automatically to open position when said cans are elevated by said lever means.

4. The combination according to claim 3, wherein said lever is secured to a horizontal bar member, said bar member being pivotally carried within lugs of an open frame on the base of said car and said cart is provided with wheel means to allow it to be mobile and when said cans are emptied into said basket, the operator lowers said lever and said cans will pivot backwards and onto the base, said lids of said cans automatically closing by gravity means and when said cans are emptied into said basket the operator of said basket reverses said motor by switch means and said belts will then return said basket pivotably to the upper portion of said body at the rear of said body, the process causing the refuse contained therein to fall by gravity means into said body of said truck.

* * * * *